J. H. JACKSON.
MACHINE FOR FORMING OR MOLDING AND LIDDING PIES AND THE LIKE.
APPLICATION FILED APR. 24, 1908.
898,478.
Patented Sept. 15, 1908.
2 SHEETS—SHEET 1.
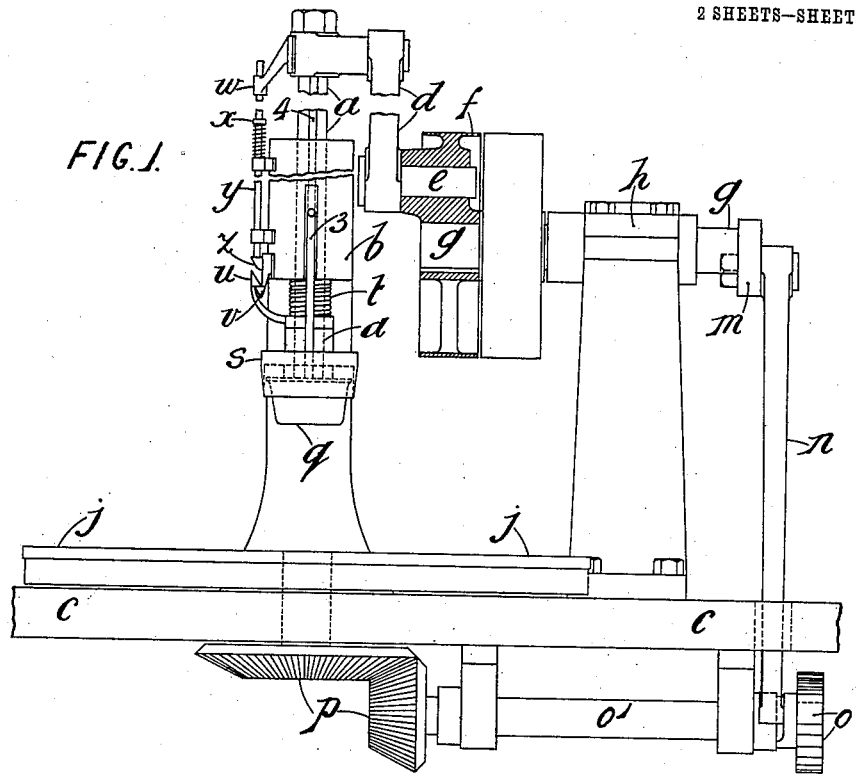
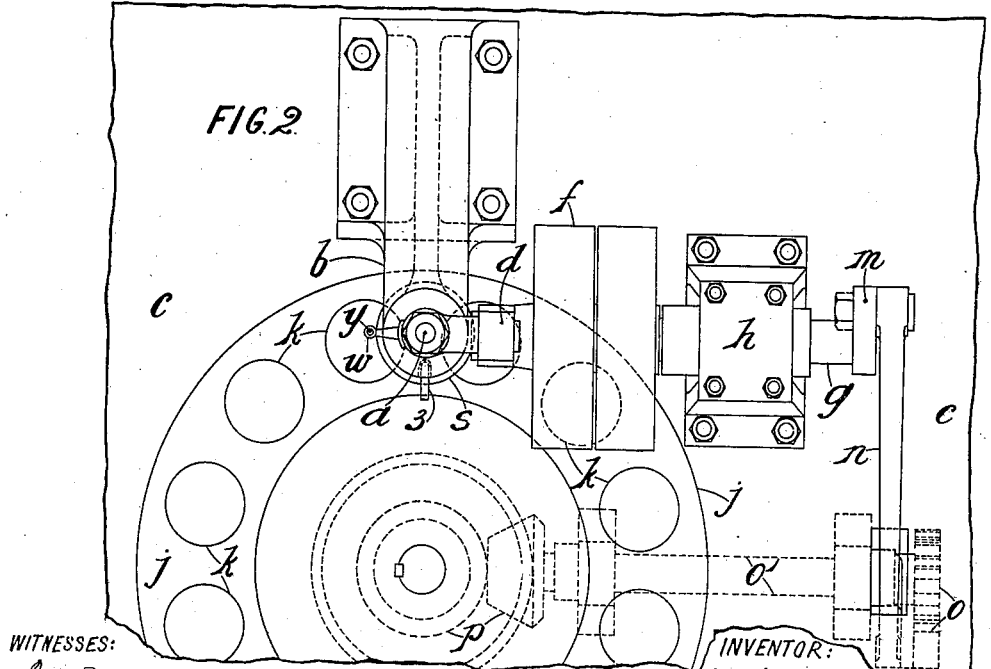
WITNESSES:
Fred White
René Ruine
INVENTOR:
Joseph Henry Jackson,
By Attorneys,
Arthur E. Chaser Ruina

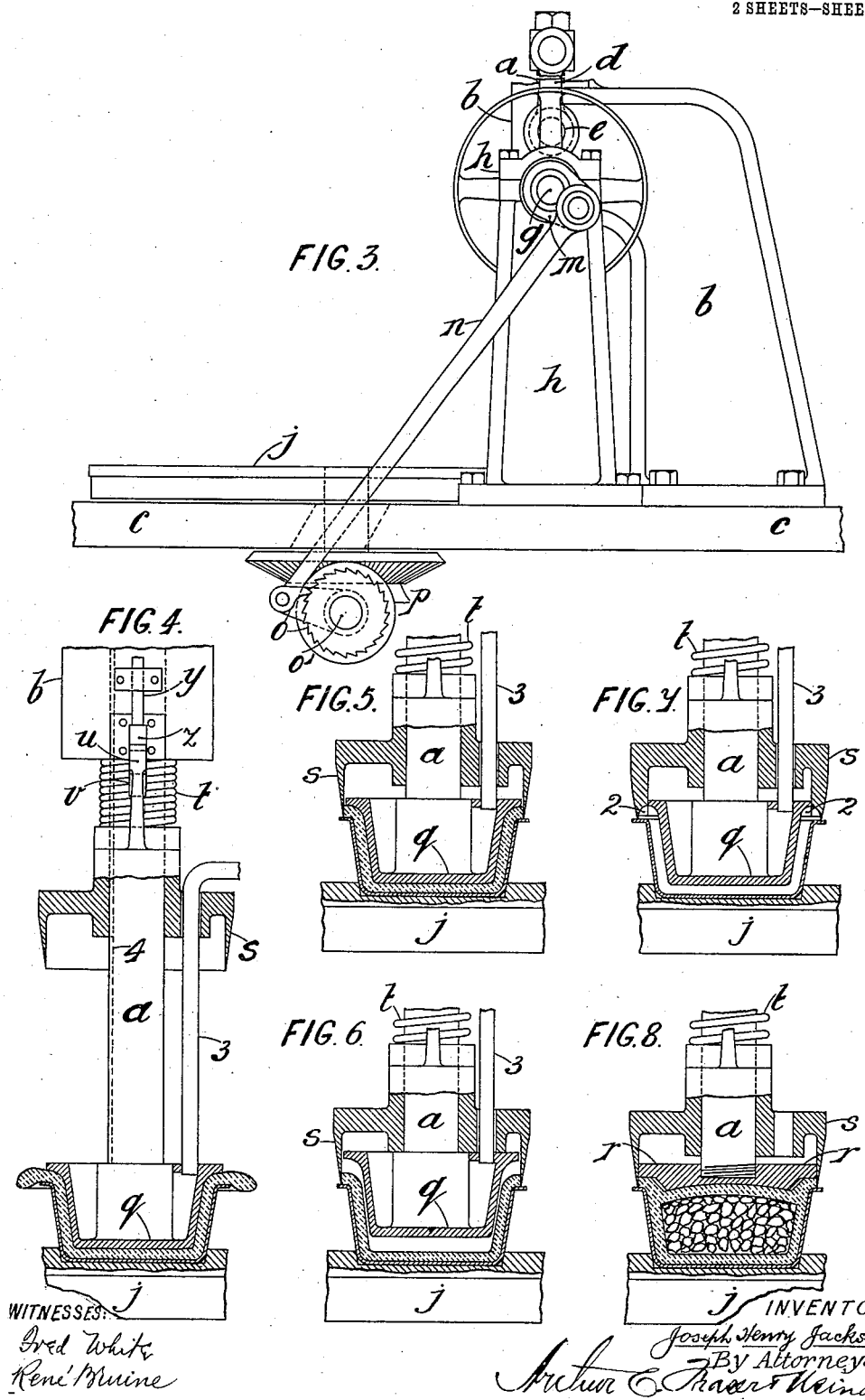

UNITED STATES PATENT OFFICE.

JOSEPH HENRY JACKSON, OF BLAYDON-ON-TYNE, ENGLAND.

MACHINE FOR FORMING OR MOLDING AND LIDDING PIES AND THE LIKE.

No. 898,478.          Specification of Letters Patent.          Patented Sept. 15, 1908.

Application filed April 24, 1908. Serial No. 429,096.

*To all whom it may concern:*

Be it known that I, JOSEPH HENRY JACKSON, a subject of the King of Great Britain and Ireland, and a resident of Blaydon-on-Tyne, in the county of Durham, England, have invented certain new and useful Improvements in Machines for Forming or Molding and Lidding Pies and the Like, of which the following is a specification.

This invention relates to machines for forming or molding and lidding meat and fruit pies, tarts, custards and the like.

At present in such machines the lidder, which shapes the lid or top crust and ornaments the edge of lidded pies or the like, also removes the superfluous paste or dough, but no means are provided for removing the superfluous paste or dough at the molding or blocking stage, and, when a number of pies or the like are to be made by a machine wherein only a single plunger is employed for carrying and operating the block or mold and the lidder, the superfluous paste or dough is not removed and recovered until all the pies or the like have been molded or blocked and are afterwards lidded.

The object of this invention is to generally improve the construction and arrangement of machines of the type described and particularly to provide means which will trim or remove the superfluous paste or dough at the molding or blocking stage, so that it may be at once utilized, in addition to removing the superfluous paste or dough at the lidding stage as customary.

A machine constructed in accordance with this invention comprises a plunger or the like adapted to be depressed and raised by suitable means and adapted to be provided with a block or mold or with a lidder, depending on whether the pies or the like are to be molded or lidded, a revoluble table adapted to carry a number of tins and to be intermittently operated to bring each tin in turn below the plunger, and a cutter or trimmer normally raised or held clear and adapted, when the plunger has descended and molded or lidded a pie or the like, to be automatically or otherwise released or operated to trim or remove the superfluous paste or dough from the molded or lidded pie or the like and to be returned to its normal position by the return stroke of the plunger or otherwise.

I will fully describe my invention with reference to the accompanying drawings wherein Figure 1 is a front elevation of a machine embodying one form of my improvements. Fig. 2 is a plan and Fig. 3 is an end view of Fig. 1 respectively. Fig. 4 is an enlarged part end view of Fig. 1, and Figs. 5, 6, 7 and 8 are similar views showing the parts in different operative positions.

Referring to the drawings, $a$ is a vertically reciprocating plunger mounted in a bracket $b$ on the table $c$ and adapted to be reciprocated by a connecting rod $d$ and a crank pin $e$ on a suitably driven pulley $f$ on a shaft $g$ mounted in a bearing or bracket $h$. On the table $c$ is pivoted a revolving table $j$ adapted to carry a number of tins in suitable holders or recesses $k$ (Fig. 2) and to be intermittently revolved by means of a crank $m$, a connecting rod $n$, ratchet mechanism $o$, a shaft $o^1$ and bevel gearing $p$ to bring each tin in turn below the plunger $a$.

The plunger $a$ is fitted with a mold or block $q$, Figs. 1, 4, 5, 6 and 7, for forming or molding the pies or the like or with a lidder $r$, Fig. 8, for lidding them. On the plunger $a$ is mounted a trimmer $s$ normally held raised, as shown in Figs. 1 and 4, against the action of a spring $t$ by a catch $u$ engaging a corresponding catch $v$ on the bracket $b$. The plunger $a$ carries a striker $w$ (Figs. 1 and 2) adapted, when the plunger has descended and molded or lidded the pie or the like, to engage a stop $x$ on the rod $y$ and operate said rod until a projection $z$ at the lower end of same disengages the catches $u$ and $v$ and releases the trimmer $s$ which then descends under the action of the spring $t$ and trims or removes the surperfluous paste or dough.

The operation of my improved machine is as follows:—The tins are supplied with paste or dough and arranged on the rotatable table $j$, which, as above described, is rotated intermittently and brings each tin in turn below the plunger $a$. When the plunger descends the block or mold $q$ enters a tin and molds the pie or the like as shown in Fig. 4, and, when this has been accomplished, the striker $w$ releases the trimmer $s$ and the latter is depressed by the spring $t$ and trims off or removes the superfluous paste or dough as shown in Fig. 5, which paste or dough can be immediately utilized. On the return stroke of the plunger $a$ the mold $q$ engages the trimmer s and returns same to its original position again, the mold q and trimmer s however being so arranged that the mold q does not engage and lift the trimmer s until the mold has been withdrawn from the molded pie or the like, as shown in Fig. 6, the trimmer s holding the tin in position and preventing movement of same while the mold is being withdrawn.

When lidding the molded pies or the like, a lidder r, Fig. 8, is substituted for the mold or block q, and, after the lidder has performed the lidding operation, the trimmer s is released as above described and removes the superfluous dough.

For molding or forming custards and unlidded tarts and the like, the mold q and trimmer s are formed with "gimped" or other suitable edges 2, Fig. 7, for ornamenting the custard or the like.

The mold q is heated as usual by gas supplied by a pipe 3 or otherwise, and the plunger a is fashioned with a key-way 4 (Figs. 1 and 4) co-acting with a key in the bracket b to prevent rotation of the plunger a, and the trimmer s is provided with a key or projection sliding in the key-way 4 to prevent turning of the trimmer on the plunger.

As will be obvious, instead of the plunger a being operated as above described, it may be operated by hand, and, instead of the cutter s being operated by the plunger, it too may be operated by hand, and in some cases the revolving table j may be dispensed with.

What I claim and desire to secure by Letters Patent is:—

1. In machines for forming or molding and lidding pies, tarts, custards and the like, the combination of a plunger adapted to be fitted with a mold or with a lidder, a trimmer mounted on said plunger, means for holding said trimmer in an inoperative position, and means for releasing and operating said trimmer to trim or remove the superfluous dough, substantially as set forth.

2. In machines for forming or molding and lidding pies, tarts, custards and the like, the combination of a plunger adapted to be fitted with a mold or with a lidder, a trimmer mounted on said plunger, means for holding said trimmer in an inoperative position, means for releasing and operating said trimmer to trim or remove the superfluous dough, a revoluble tin-carrying table, and means for intermittently rotating said table so as to bring each tin in succession below said plunger, substantially as and for the purposes set forth.

In witness whereof, I have hereunto signed my name in the presence of two subscribing witnesses.

JOSEPH HENRY JACKSON.

Witnesses:
   EDMUND WARD PATTISON,
   H. NIXON.